United States Patent
Howard

(10) Patent No.: US 8,705,743 B2
(45) Date of Patent: Apr. 22, 2014

(54) COMMUNICATION SECURITY

(75) Inventor: Peter Thomas Howard, Newbury (GB)

(73) Assignee: Vodafone Group PLC, Newbury, Berkshire (GB)

(*) Notice: Subject to any disclaimer, the term of this patent is extended or adjusted under 35 U.S.C. 154(b) by 1217 days.

(21) Appl. No.: 12/064,595

(22) PCT Filed: Aug. 24, 2006

(86) PCT No.: PCT/GB2006/003164
§ 371 (c)(1),
(2), (4) Date: Sep. 22, 2008

(87) PCT Pub. No.: WO2007/023286
PCT Pub. Date: Mar. 1, 2007

(65) Prior Publication Data
US 2009/0220091 A1    Sep. 3, 2009

(30) Foreign Application Priority Data

Aug. 25, 2005   (GB) .................................. 0517592.2

(51) Int. Cl.
*H04L 29/06* (2006.01)
*H04L 9/08* (2006.01)

(52) U.S. Cl.
CPC ........... *H04L 9/0802* (2013.01); *H04L 63/0428* (2013.01)
USPC ................ 380/277; 380/255; 713/171; 726/3

(58) Field of Classification Search
CPC .......................... H04L 9/0802; H04L 63/0428
USPC ......................... 380/277, 255; 713/171; 726/3
See application file for complete search history.

(56) References Cited

U.S. PATENT DOCUMENTS

| 6,058,188 | A  | * | 5/2000  | Chandersekaran et al. ... 380/286 |
| 6,915,345 | B1 | * | 7/2005  | Tummala et al. ............. 709/225 |
| 7,079,499 | B1 | * | 7/2006  | Akhtar et al. ................. 370/310 |
| 7,733,788 | B1 | * | 6/2010  | Michalski et al. ............ 370/242 |
| 2004/0168050 | A1 | * | 8/2004  | Desrochers et al. .......... 713/153 |
| 2005/0063544 | A1 | * | 3/2005  | Uusitalo et al. ............... 380/277 |
| 2005/0243798 | A1 | * | 11/2005 | Dunn et al. ................... 370/352 |
| 2005/0246548 | A1 | * | 11/2005 | Laitinen ........................ 713/182 |
| 2007/0160201 | A1 | * | 7/2007  | Blom et al. ..................... 380/30 |
| 2009/0013380 | A1 | * | 1/2009  | Chandrasiri et al. ............. 726/3 |

FOREIGN PATENT DOCUMENTS

WO    WO 03/049357    6/2003

OTHER PUBLICATIONS

Howard, P. et al., "Towards a Coherent Approach to Third Generation System Security" 3G Mobile Communication Technologies, Mar. 26-28, 2001, pp. 21-27.*
Ericsson, "3GPP TSG SA WG3 Security" Jan. 31-Feb. 1, 2002, pp. 1-4.*
Menezes, A. et al., "Handbook of Applied Cryptography" CRC Press, 1996, pp. 546-548.*

(Continued)

*Primary Examiner* — Michael Pyzocha
(74) *Attorney, Agent, or Firm* — Workman Nydegger

(57) ABSTRACT

The current IMS security architecture only protects data transmitted in the IMS control plane. Embodiments are described which provide end-to-end encryption of data transmitted in the IMS media plane but which also allow lawful interception and interpretation of such end-to-end communications under the control of the relevant IMS core (3A, 3B).

19 Claims, 4 Drawing Sheets

(56) References Cited

OTHER PUBLICATIONS

Menezes, Oorshcot, Vanstone: Handbook of Applied Cryptography, CRC Press Series on Discrete Mathematics and its Applications, 1997, p. 546-548, 553-555, 570, 571, 550, 584-586, XP002409097, Boca Raton, FL US.

Denning D.R. et al., Taxonomy for Key Escrow Encryption Systems, Communication of the Association for Computing Machinery, ACM New York, NY, US vol. 39, No. 3, Mar. 1, 1996 pp. 34-40.

International Search Report issued on Dec. 12, 2006 in corresponding PCT Application No. PCT/GB2006/003164.

* cited by examiner

COMMUNICATION SECURITY

FIELD OF THE INVENTION

The present invention relates to a method and apparatus for establishing a secure communication channel between a first device and a second device via a communication network.

BACKGROUND OF THE INVENTION

The third generation partnership project (3GPP) has recently defined a new concept known as IMS (IP-based Multimedia Subsystem). The aim of IMS is to allow users such as mobile telephone network operators to provide services to their subscribers as efficiently and effectively as possible. For example, the IMS architecture supports the following communication types: voice, video, instant messaging, "presence" (a user's availability for contact), location-based services, email and web. Further communication types are likely to be added in the future.

This diverse collection of communication devices requires efficient session management due to the number of different applications and services that will be developed to support these communication types. The 3GPP have chosen Session Initiation Protocol (SIP) for managing these sessions.

The SIP protocol is a session-based protocol designed to establish IP based communication sessions between two or more end points or users. Once a SIP session has been established, communication between these end points or users can be carried out using a variety of different protocols (for example those designed for streaming audio and video). These protocols are defined in the SIP session initiation messages.

With IMS, users are no longer restricted to a separate voice call or data session. Sessions can be established between mobile devices that allow a variety of communication types to be used and media to be exchanged. The sessions are dynamic in nature in that they can be adapted to meet the needs of the end users. For example, two users might start a session with an exchange of instant messages and then decide that they wish to change to a voice call, possibly with video. This is all possible within the IMS framework. If a user wishes to send a file to another user and the users already have a session established between each other (for example, a voice session) the session can be redefined to allow a data file exchange to take place. This session redefinition is transparent to the end user.

In addition to the use of UMTS Radio Access Networks (UTRAN) to access an IMS-based call, an IMS-based call may also be accessed by alternative access networks, such as WLAN, fixed broadband connections and the like.

There are three distinct operational planes in the IMS architecture: the application plane, the control plane and the media plane.

The application plane includes various application server types that are all SIP entities. These servers host and execute services.

The control plane handles session signalling and includes distinct functions to process the signalling traffic flow, such as Call Session Control Functions (CSCF), Home Subscriber Server (HSS), Media Gateway Control Function (MGCF) and Media Resource Function Controller (MRFC). Subscriber requested services are provided using protocols such as SIP and Diameter.

The media plane transports the media streams directly between subscribers.

The current IMS security architecture specified in TS 33.203 defines a mechanism for protecting the IMS control plane. Currently, protection in the media plane relies on the underlying bearer network security mechanisms. For IMS access over GSM Edge Radio Access Network (GERAN) or UTRAN access networks, this may be sufficient because the GERAN and UTRAN access security mechanisms provide a good level of security. However, for IMS access over fixed broadband and WLAN, the security of the underlying bearer network may be insufficient.

There are two possible solutions to providing a secure communication channel between a first device and a second device. Security may be provided in the path between each device and its respective access gateway to an IMS core (this path being the most vulnerable part of the communication channel), or advantageously security is supplied on an end-to-end basis between the respective devices. The end-to-end approach is advantageous because less network resource is used as repeated encryption/decryption and decryption/encryption at each gateway is not required (in contrast to when security is terminated at respective access gateways). The end-to-end approach also avoids restrictions on media plane routing.

Although the provision of the secure end-to-end communication channel between respective devices is desirable to prevent unauthorised interception and disclosure of the data transmitted in the communication channel, it is also desirable to enable interception and interpretation of data transmitted on the secure communication channel in special circumstances. Such "lawful interception" may be desirable on behalf of governmental authorities to detect illegal activities.

SUMMARY OF THE INVENTION

According to a first aspect of the present invention, there is provided a method for establishing a secure end-to-end communication channel for sending secure messages between the first device and the second device, each device being associated with a communication network core, and wherein at least one of the devices includes security data for generating the secure messages, the method including providing the or at least one of the network cores with interception data to enable the network core to interpret the messages sent between the first and second devices.

In the embodiment, the network core is provided with the interception data in order to allow the network core to perform "lawful interception" of the secure messages for the purposes of, for example, detecting illegal activity.

In the embodiment, the network core is an IMS network core. The secure messages are sent in the IMS media plane and the interception data is provided to the network core in the IMS control plane. The control plane may be protected by security architecture, such as that defined in 3GPP TS 33.203.

In the embodiment, the first and second devices may be cellular communications terminals, although other types of communication device could of course be used. The terminals may include authentication storage means which store authentication information. The authentication means may be a subscriber identity module (SIM), such as defined in the GSM or UMTS Standards.

In the embodiment 3GPP Generic Authentication Architecture (GAA) is used to agree a key between the terminals and Network Application Function (NAF). Such a NAF may be a key management centre, associated with the network core.

The communication channel may be secured using MIKEY protocol. Within MIKEY protocol, RSA Encryption or Diffie Hellman encryption may be used.

The first terminal may provide the second terminal with key means for decrypting the messages by sending this key means over the control plane in encrypted form. A step of providing the key means in encrypted form may include encrypting the key means with the key agreed according to 3GPP GAA.

In another embodiment the secure messages include a key recovery field. The network core is able to receive this key recovery field and use its content to interpret the secure messages in order to allow lawful interception thereof. The key recovery field may include an indication of the key used to secure the messages.

The present invention also relates to a network core as defined in the claims.

For a better understanding of the present invention, embodiments will now be described with reference to the accompanying drawings, in which.

In the drawings like elements are generally designated with the same reference sign.

Figure 1:
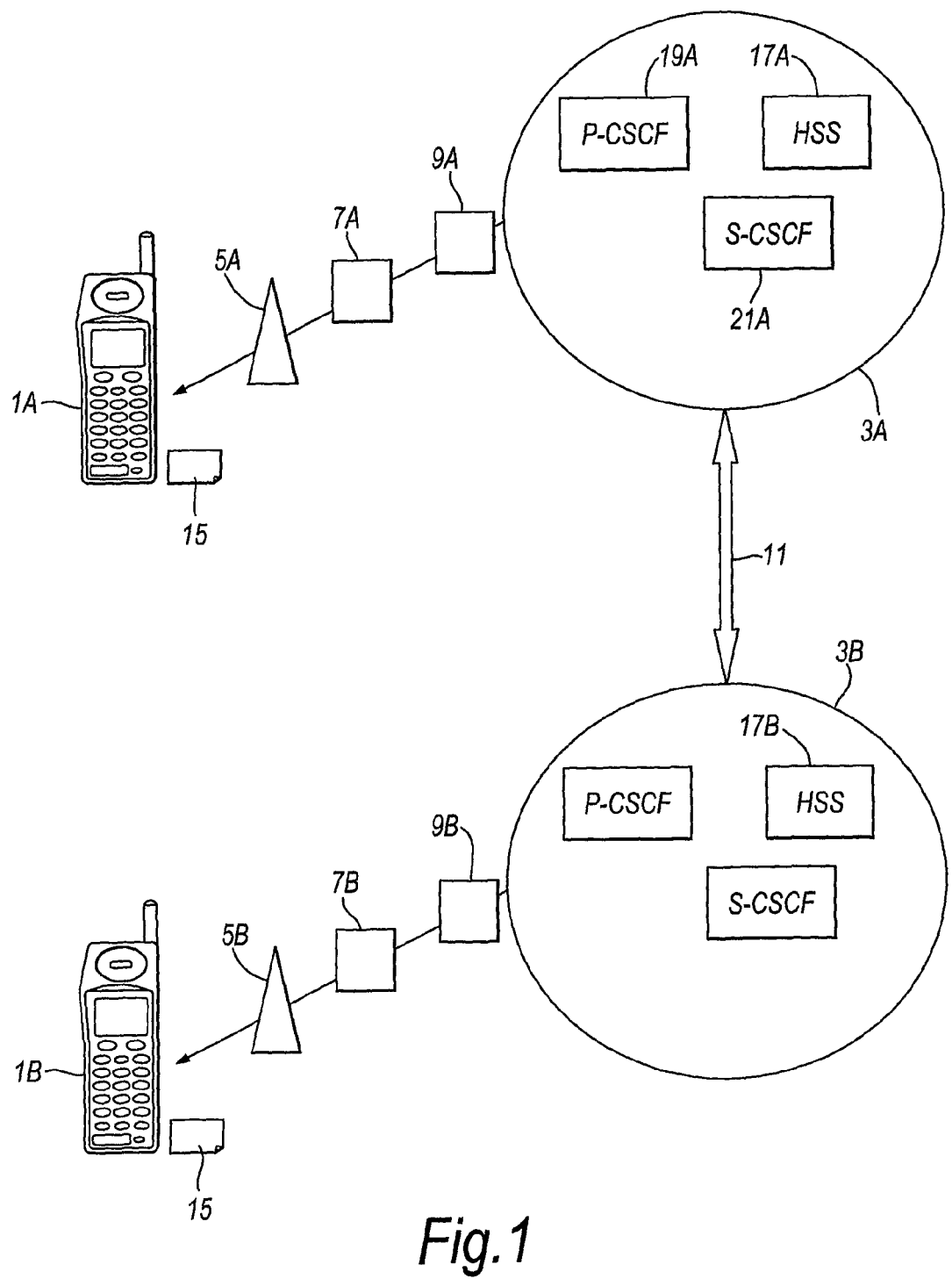
FIG. 1 shows schematically the communication elements provided to allow respective terminals to communicate with one another.

FIG. 1 shows schematically a communications network. Terminal 1A is registered with IMS network core 3A. The terminal 1A may be a handheld mobile or cellular telephone, a personal digital assistant (PDA) or a laptop computer equipped with a data card or embedded 3G modules and SIM. The terminal 1A communicates wirelessly with the network core 3A via a radio access network (RAN) 5A, comprising, in the case of a UMTS network, base station (Node B) and radio network controller (RNC). Communications between the terminal 1A and the network 3A are routed from the radio access network SA via serving GPRS support node (SGSN) 7A and gateway GPRS support node (GGSN) 9A, which may be connected by a fixed (cable link) to the network core 3A. The GGSN 9A enables IP-based communications with the core network 3A.

In the conventional manner, a multiplicity of other terminals may be registered with the network core 3A. These other terminals may communicate with the network core 3A in a similar manner to the terminal 1A, that is via the radio access network 5A, SGSN 7A and GGSN 9A. Alternatively, the other terminals may communicate via a different access network, such as broadband Internet or WLAN.

Similarly, terminal 1B is registered with IMS network core 3B, and communicates therewith via RAN 5B, SGSN 7B and GGSN 9B.

The respective network cores 3A,3B are connected by communication link 11.

Each of the mobile terminals 1A, 1B is provided with a respective subscriber identity module (SIM) 15. During the manufacturing process of each SIM, authentication information is stored thereon under control of the relevant network core 3A,3B. The network core 3A,3B itself stores details of each of the SIMs under its control in its Home Subscriber Server (HSS) 17A,17B.

In operation of the network core 3A, terminal 1A is authenticated (for example, when the user activates the terminal in the RAN 5A with a view to making or receiving calls) by the network core 3A sending a challenge to the terminal 1A incorporating the SIM 15, in response to which the SIM 15 calculates a reply (dependent on the predetermined information held on the SIM—typically an authentication algorithm and a unique key Ki) and transmits it back to the network core 3A. The HSS 17A includes an authentication processor which generates the challenge and which receives the reply from the terminal 1A. Using information pre-stored concerning the content of the relevant SIM 15, the authentication processor calculates the expected value of the reply from the mobile terminal 1A. If the reply received matches the expected calculated reply, the SIM 15 and the associated terminal 1A are considered to be authenticated. Authentication between the mobile terminal 1B and the network core 3B occurs in a similar way.

Described thus far is the media plane connection between the terminal 1A and the network core 3A. As mentioned above, the control plane handles session signalling and is intended to be access independent—that is the session signalling the network core is the same, irrespective of whether the network core is accessed via a mobile or cellular telecommunications network (comprising RAN 5A, SGSN 7A and 9A), or accessed via a fixed broadband connection or WLAN connection.

In the control plane, the terminal 1A communicates, via the RAN 5A, SGSN 7A and GGSN 9A, initially with the proxy-CSCF (P-CSCF) 19A. The P-CSCF 19A ensures that SIP registration is passed to the correct home network core and that SIP session messages are passed to the correct serving CSCF (S-CSCF) 21A once registration of the terminal with its home network core (3A in this embodiment) has occurred. The user is allocated a P-CSCF 19A as part of the registration, and provides a two-way IPsec association with the device 1A. All signalling traffic traverses the P-CSCF 19A for the duration of a communication session.

The S-CSCF 21A interacts with the HSS 17A to determine user service eligibility from a user profile. The S-CSCF 21A is allocated for the duration of the registration The S-CSCF 21A is always in the home network core 1A of the terminal. The P-CSCF 19A may be in the home network or in a visited network core.

Figure 2:
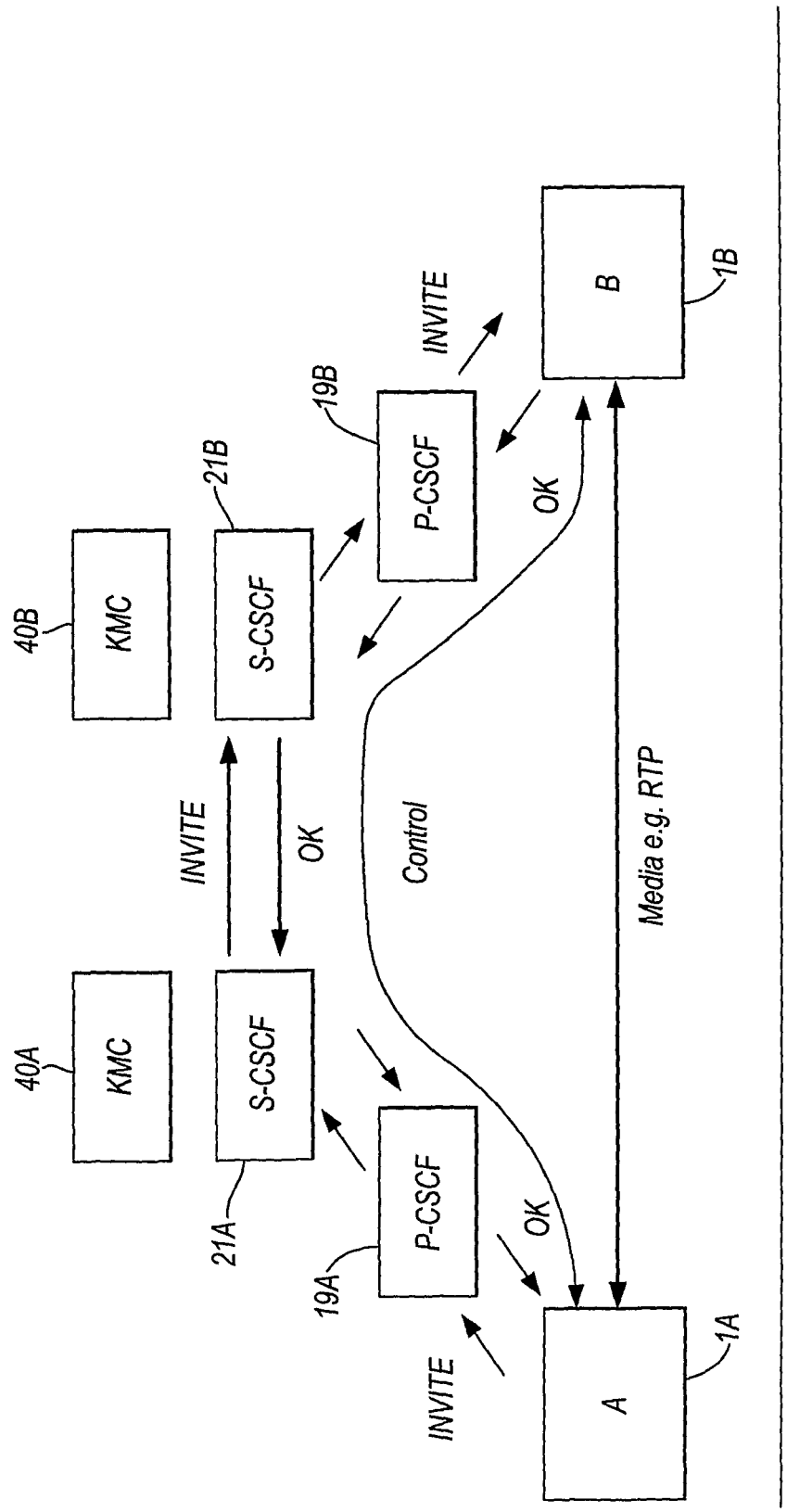
FIG. 2 shows schematically the communication between the respective terminals in the media plane and in the control plane.

Control plane signalling and the media plane signalling follow different paths, as indicated above, and as shown schematically in FIG. 2. As mentioned earlier, the current IMS security architecture in TS 33.203 protects the IMS control plane only. It is assumed that the media plane is secure. Whilst the media plane may be adequately secure in a GERAN or UTRAN access network, this may not be so for a WLAN access network or other types of access network.

Briefly, the control plane security is provided by the S-CSCF 21A running SIM-based authentication and key agreement with the IMS client present on the mobile terminal 1A. A session key is passed to the P-CSCF 19A and used to integrity and confidentiality protect signalling between the terminal 1A and the P-CSCF 19A using IPsec. Optionally, IPsec with UDP encapsulation may be used for IMS access over non-cellular access where a network address translator (NAT) may be present.

3GPP specifies the use of IPsec, and specifies a public key infrastructure (PKI) based key management solution for establishing IPsec between IMS cores. The use of transport layer security (TLS) is also possible.

Security protocols for media plane protection:
Real Time Transport Protocol RTP media, for example:
SRTP (RFC3711 )
Non-RTP media, for example:
TLS/DTLS
IPsec
S/MIME
. . .
Key management:
Handshake in signaling channel, for example:
MIKEY (RFC3830, draft-ietf-mmusic-kmgmt-ext)
SDP Security Descriptions (draft-ietf-mmusic-sdescriptions, etc.)
Handshake in media channel, for example:
ZRTP (draft-zimmermann-avt-zrtp)
EKT (draft-mcgrew-srtp-ekt)
RTP/DTLS (draft-tschofenig-avt-rtp-dtls, etc.)

Various security protocols and key management schemes for protecting data communication in the media plane have been proposed. However, as discussed earlier, it may be desirable or a requirement for IMS network cores to facilitate lawful interception and interpretation of such encrypted data.

For example, if an IMS network core operator is actively assisting in helping users encrypt IMS media, then that operator might be required to provide information to remove that encryption for lawful interception and interpretation purposes. The home IMS network operator for a user must be able to provide information to remove the encryption provided. Possibly any visited IMS network operator might also have to provide information to remove encryption.

Media may be routed through a network that does not operate the involved P-CSCF 19A and S-CSCF 21A. However, it is assumed that there will be no requirement on that network to be able to provide information to remove the encryption.

It is also advantageous that users are not able to determine whether or not their communications are subject to lawful interception and interpretation at any particular time. It should be made difficult for a user to make use of operator-provisioned media security capabilities whilst at the same time circumventing the lawful interception and interpretation of the media.

Figure 3:
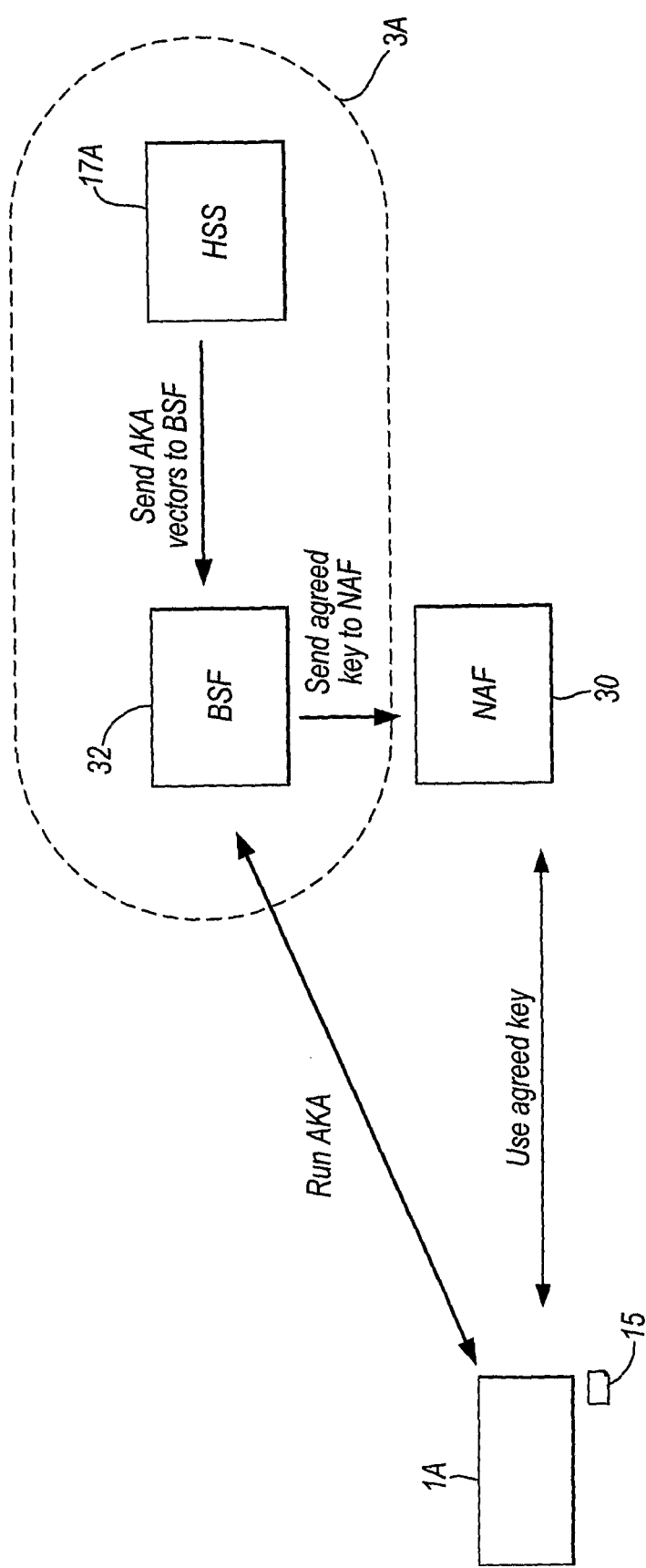
FIG. 3 shows the mechanism by which a key is agreed between a mobile terminal and a network application function using the 3GPP generic authentication architecture.

FIG. 3 shows schematically the known 3GPP Generic Authentication Architecture (GAA) procedure for agreeing a key for use between the terminal 1A and a Network Application Function (NAF) 30. The NAF 30 represents a generic application server that provides any kind of service (application) to the terminal 1A.

IMS network core 3A operator, as mentioned above, is able to authenticate the mobile terminals with using the authentication information stored on the terminal's SIM 15. The GAA re-uses this authentication information to provide an application-independent mechanism to provide the mobile terminal 1A (client) and application server (NAF 30) with a common shared secret (key) based on 3GPP Authentication and Key Agreement (AKA) protocols.

A generic Boot Strapping server Function (BSF) 32 is provided in the IMS network core 3A. When the terminal 1A interacts with the NAF 30 for the first time, boot strapping authentication is performed. The mobile terminal 1A sends an appropriate request to the BSF 32. The BSF 32 retrieves authentication data for the SIM 15 associated with the terminal 1A (AKA vectors) from the HSS 17A. The terminal 1A and BSF 32 then agree on session keys. The session keys are passed from the BSF32 to the NAF30, and are subsequently used to protect communication between the mobile terminal 1A and the NAF.

The shared secret (key) is obtained by a known procedure, which is now briefly discussed in more detail When the terminal 1A interacts with the NAF 30 the first time, it performs the bootstrapping authentication. The terminal 1A sends a request to the BSF 32. The BSF 32 retrieves a complete set of Generic Bootstrapping Architecture (GBA) user security settings and one authentication vector (RAND, AUTN, XRES, IK, CK) from the HSS 17A. Then the BSF 32 forwards RAND and AUTN to the terminal 1A. The terminal 1A sends RAND and AUTN to the SIM 15 which calculates IK, CK, MAC and RES and checks the MAC to verify that the parameters come from an authorised network. Afterwards the SIM 15 generates the key Ks by concatenating IK and CK. The RES value is sent to the BSF 32 where it authenticates the terminal 1A. The BSF 32 calculates the key Ks as well and generates the B-TID which is sent to the terminal 1A to indicate the success of the authentication. Additionally the BSF 32 supplies the lifetime (validity period) of the Ks. The terminal 1A (or SIM 15) and the BSF 32 store the key Ks with the associated B-TID for further use, until the lifetime of Ks has expired, or until the key Ks is updated. In case of the expiration of the Ks or a required key update of the NAF30 (bootstrapping renegotiation request), the bootstrapping procedure has to be started again.

After completion of the Bootstrapping Mode, the NAF30 specific keys will be calculated in a procedure called Key Derivation Mode. Two variants are possible GBA_ME and GBA_U. In the following we describe the GBA_ME variant.

Both the terminal IA and the BSF 32 use the Ks to derive the key material Ks_NAF. The key derivation function of these keys is KDF=[Ks, "gba-me", RAND, IMPI, NAF_ID]. The BSF 32 sends the Ks_NAF to the NAF 30 which then can set up a secure communication with the terminal 1A based on these shared keys. The terminal 1A stores the Ks_NAF with the corresponding B_TID and NAF_ID in its memory for further sessions.

After the bootstrapping has been completed, the terminal 1A and a NAF 30 can run an application specific protocol where the authentication of messages will be based on those session keys generated during the mutual authentication between terminal 1A and BSF 32.

When a terminal 1A starts a further session with the NAF 30, the stored keys will be reused. The terminal 1A supplies the B-TID to the NAF 30. By means of the B-TID, the NAF 30 retrieves the identity of the user and the corresponding Ks_NAF from the BSF. Finally the terminal 1A and the NAF 30 may authenticate each other using the shared Ks_NAF.

Multimedia Internet Keying (MIKEY) will now be described. MIKEY is a key management scheme that can be used for real-time applications.

In MIKEY different traffic encryption keys (TEK) for each session in the call are derived from a common TEK generation key (TGK), e.g. TEK1 for video stream, TEK2 for audio stream, etc. MIKEY protocol has a maximum two passes—and can be integrated into SDP offer/answer with no extra roundtrips. MIKEY can be carried in SDP and RTSP according to draft-ietf-mmusic-kmgmt-ext. MIKEY offers three key management methods:
Pre-shared key
Initiator generates TGK which is protected using pre-shared key
RSA encryption
Initiator generates TGK which is protected using receiver's public key Initiator must fetch responder certificate in advance
Diffie Hellman
  Both initiator and responder contribute to TGK
  Initiator and responder certificates can be transported in MIKEY messages
  Provides perfect forward secrecy
MIKEY only supports SRTP but can be extended to support other security protocols More information about MIKEY can be obtained from IETF document RFC 3830, which is hereby fully incorporated by reference.

The establishment of secure end-to-end communication channels in the media plane will now be described.

End-to-end key protected using IMS control plane security.

Referring to FIG. 2, the procedure will now be described when an IMS communication channel is established between terminal 1A and terminal 1B. Terminal 1A belongs to (i.e. is registered with and/or is a subscriber of) network core 3A and registers on S-CSCF 21A through P-CSCF 19A. Similarly, terminal 1B belongs to (i.e. is registered with and/or is a subscriber of) network core 3B and registers on S-CSCF 21B through P-CSCF 19B. For the purposes of media plane security, each network has a respective key management centre (KMC) 40A, 40B, which could be realised as SIP application servers.

During the establishment of a communication channel, S-CSCF 21A and S-CSCF 21B intercept the signalling flow and request KMC 40A and KMC 40B respectively to help establish an end-to-end protective media channel or channels. Security association establishment request messages could be integrated with the call establishment signalling, i.e. a SIP INVITE manage. After call establishment, the end-to-end media channel could be protected using an agreed security association.

For example, the security association could be provided by the following key management mechanism.

1. For each media call, KMC 40A generates a key component K1. K1 is transmitted to terminal 1A over the protected IMS control plane channel between terminal 1A and P-CSCF 19A. KMC 40B also generates a similar key component K2, which is transmitted to terminal 1B over the protected channel between terminal 1B and P-CSCF 19B.

2. Terminal 1A and terminal 1B exchange key components K1 and K2 over the protected IMS control plane channel.

The keys K1 and K2 may be used in several ways:

(A) mobile terminal 1A transmits data in the media plane using key K1. Terminal 1B is able to decrypt this message because key K1 has been transmitted to it over the IMS control plane channel. Similarly, terminal 1B encrypts its communications in the media plane to terminal 1A using its key K2. Terminal 1A is able to decrypt these communications because key K2 has been provided to terminal 1A over the IMS control plane channel.

(B) Terminal 1A and terminal 1B both generate a shared key, K12 (K12=KDF (K1, K2), where KDF is a key derivation function, e.g. K12=K1 XOR K2), which is used to protect the end-to-end channel in the media plane.

(C) Further alternatively, KMC 40A and KMC 40B exchange K1 and K2, generate shared key K12, and then distribute the shared key K12 to respective terminals 1A and 1B over the protected IMS control plane channel.

(D) In another alternative, terminal 1A and terminal 1B use KMC 40A and KMC 40B to exchange the existing IMS control plane keys and to generate the end-to-end key by combining them in some way. For example, the shared key K12=KDF (CKA, IKA, CKB, IKB), where KDF is a key derivation function. Such a mechanism is similar to the mechanism that was originally proposed, but never standardised, for protecting UMTS release 99 on an end-to-end basis at the bearer level, as disclosed in 3GPP document S3-010089, which is fully here incorporated by reference.

Advantageously, the P-CSCF 19A, S-CSCF 21A, KMC 40A, P-CSCF 19B, S-CSCF 21B and KMC 40B can obtain the keys K1, K2 and K12, and this can be used in lawful interception and interpretation of the messages transmitted between terminals 1A and 1B in the media plane.

A disadvantage of some of the arrangements (A) to (D) discussed above is that the keys K1, K2 and K12 might be intercepted by unauthorised parties at some unprotected portion of the IMS control plane. The thus obtained keys could then be used to decrypt the data transmitted on the media plane.

End-to-end key protected using dedicated per hop security

Figure 4:
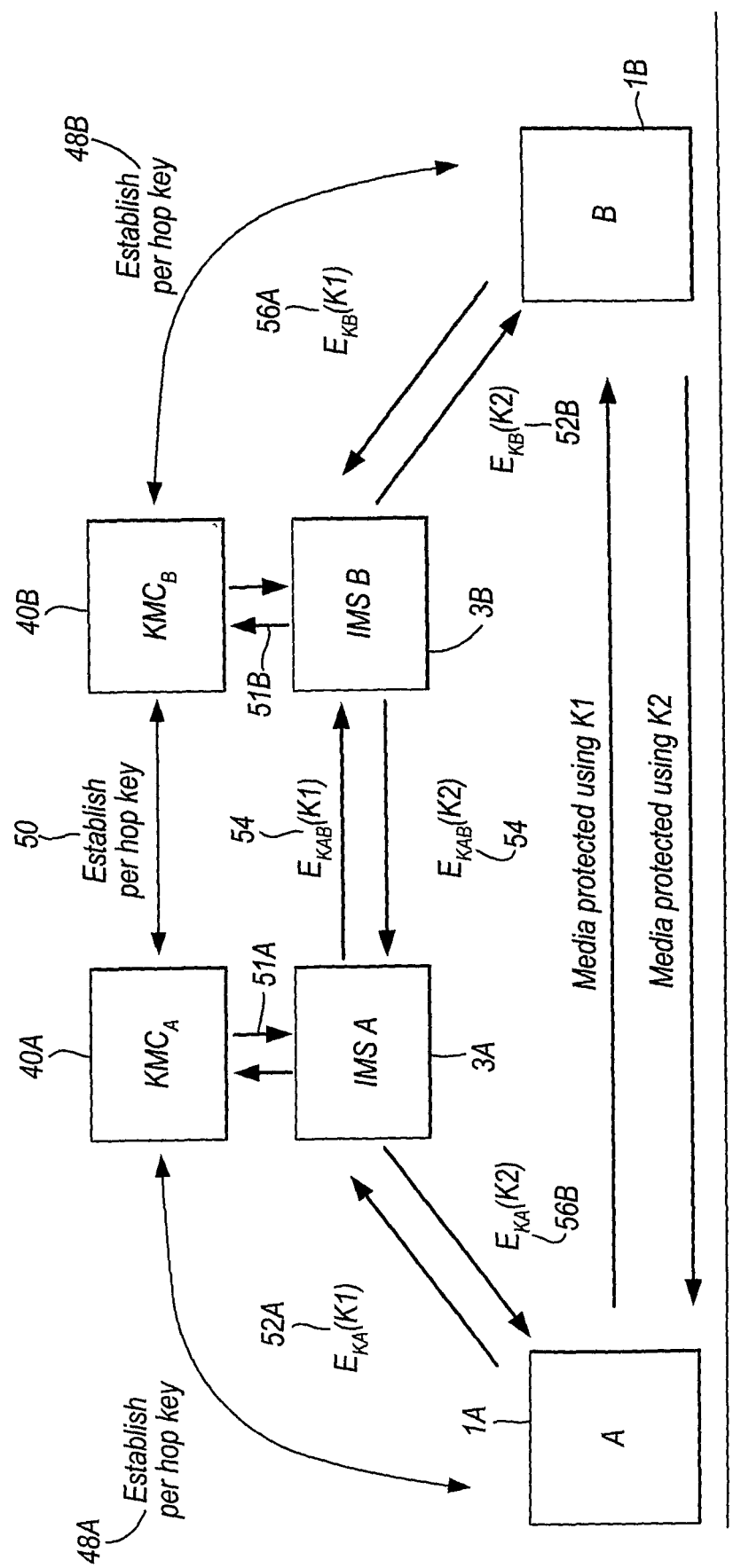
FIG. 4 shows the mechanism for providing protected media plane communications between respective terminals and exchange of keys between those terminals using control plane security.

The arrangement described above in relation to FIG. 2 is modified so that a key $E_{KA}$ as shown in FIG. 4 at 48A is established between terminal 1A and the KMC 40A. The key $E_{KA}$ is established using the GAA as described with reference to FIG. 3 (the KMC 40A acting as the NAF 30). Similarly, the mobile terminal 1B establishes at 48B a key $E_{KB}$ with its KMC 40B using GAA (KMC 40B acting as a second NAF 30). The KMC 40A and KMC 40B establish a key $E_{KAB}$ 50 between them using, for example, 3GGP network domain security/authentication framework (NDS/AF), as defined in Specification TR33.810, which is hereby fully incorporated by reference.

Terminal 1A then generates an end-to-end key K1 for use in securing communications between itself and terminal 1B. The key K1 is encrypted using the key $E_{KA}$ to form $E_{KA}$ (K1) 52A, which is then transmitted to IMS core 3A and from there to KMC 40A. KMC 40A then extracts the key K1 using key $E_{KA}$, and encrypts the key K1 with the key established between the KMC 40A and the KMC 40B, to create the package $E_{KAB}$ (K1) 54. This package is sent to IMS core 3A, and from there to IMS core 3B, and from there to KMC 40B where it is decrypted using the key $E_{KAB}$. The key K1 is then encrypted using the key $E_{KB}$ established between the KMC 40B and the terminal 1B, and is transmitted to IMS core 3B and from there to the terminal 1B in package $E_{KB}$ (K1) 56A. The terminal 1B uses its knowledge of $E_{KB}$ to extract K1 and store it for future use.

Terminal 1B establishes a key K2 for encrypting communications that it wishes to send to terminal 1A. This key K2 is transmitted to network core 3B, and from there to KMC 40B, and from there to network core 3B, and from there to network core 3A, and from there to KMC 40A, and from there to network core 3A, and from there to mobile terminal 1A. At each hop between these elements, the key K2 is encrypted using the relevant keys established using GAA ($E_{KB}$, $E_{KA}$) and $E_{KAB}$, as shown in the Figure, to form packages $E_{KB}$ (K2) 52B, $E_{KAB}$ (K2) 54 and $E_{KA}$ (K2) 56B. The terminal 1A uses its knowledge of $E_{KA}$ to extract K2 and store it for future use.

Data transmitted from terminal 1A to terminal 1B in the media plane can then be encrypted using key K1. Terminal 1B is able to decrypt this data because it has been provided with K1 in the process described above. Similarly, data transmitted in the media plane from terminal 1B to terminal 1A is encrypted using key K2, and this data can be decrypted by terminal 1A because the key K2 has been transmitted over the control plane in the manner described above.

In this arrangement the keys K1 and K2, when transmitted in the IMS control plane are transmitted in encrypted form (by keys $E_{KA}$, $E_{KB}$ and $E_{KAB}$). However, advantageously, the KMC 40A and KMC 40B can derive the keys K1 and K2 from their knowledge of $E_{KA}$ and $E_{KB}$, respectively, and this can be used in lawful interception and interpretation of the messages transmitted between terminals 1A and 1B in the media plane.

A disadvantage of this arrangement is that numerous encryption and decryption steps are required to transmit the keys K1 and K2 between terminals 1A and 1B in the control plane.

Certificate based MIKEY with end-to-end key revealed to network core

In the manner described above in relation to FIG. 4 a shared key $E_{KA}$ is established between terminal 1A and KMC 40A using GAA, and similarly a shared key $E_{KB}$ is established between terminal 1B and KMC 40B. Each terminal also has a key pair and acquires a certificate e.g. from their respective KMC 40A,40B.

The certificates are used to establish end-to-end keys for media plane security using MIKEY RSA encryption or by the Diffie-Hellman method in a known manner.

In accordance with an important feature of this embodiment, Key Recovery Fields (KRF) are added to the control plane exchanges to allow the end-to-end keys to be made available to the IMS cores 3A,3B for the purpose of lawful interception and interpretation Mikey Rsa Encrypton In the conventional manner, mobile terminals 1A and 1B are each provided with a respective public-private key pair. The public key of the mobile terminal 1A and the public key for terminal 1B are made freely available, so that the mobile terminal 1A has knowledge of the public key of terminal 1B, and mobile terminal 1B has knowledge of the public key of mobile terminal 1A. The private key of mobile terminal 1A known only to terminal 1A, and the private key of terminal 1B is known to terminal 1B.

The certificates certify the authenticity of the public key of the terminal 1A and the terminal 1B. The certificates are acquired from the KMC 40A and 40B, respectively, using GAA. As described above, the GAA generates a shared key $E_{KA}$ between terminal 1A and its KMC 40A. Similarly, GAA generates a shared key $E_{KB}$ between terminal 1B and KMC 40B.

As mentioned above, the MIKEY encryption method is disclosed in document RFC 3830.

In the embodiment, terminal 1A, acting as the "initiator", generates a modified MIKEY initiation message, as follows:
I_MESSAGE=HDR, T, RAND,
[IDi]CERTi], [IDr], {SP}, KEMAC,
[CHASH], PKE, SIGNi, KRFi The last field of this message, KRFi, is a key recovery field.

The MIKEY initiation message includes the following conventional elements:
 Common Header Payload (HDR)
 T is the 64-bit timestamp sent by the Initiator
 RAND Payload (RAND)
 Initiator ID Payload (IDi)
 Initiator Certificate Payload (CERTi)
 Responder ID Payload (IDr)
 Security Policy Payload (SP)
 Key Data Transport Payload (KEMAC)
 Initiator's signature key Cert Hash Payload (CHASH)
 Envelope Data Payload (PKE)
  The SIGNi is a signature covering the entire MIKEY message, using the Initiator's signature key The main objective of the Initiator's message is to transport one or more TGKs and a set of security parameters to the Responder in a secure manner. This is done using an envelope approach where the TGKs are encrypted (and integrity protected) with keys derived from a randomly/pseudo-randomly chosen "envelope key". The envelope key is sent to the Responder encrypted with the public key of the Responder.

The PKE contains the encrypted envelope key: PKE=E (PKr, env_key). It is encrypted using the Responder's public key (PKr). If the Responder possesses several public keys, the Initiator can indicate the key used in the CHASH payload.

The KEMAC contains a set of encrypted sub-payloads and a MAC:

KEMAC=E(encr_key, IDi ||{TGK})||MAC (encr-key is an encryuption key derived from the envelope key).

The first payload (IDi) in KEMAC is the identity of the Initiator (not a certificate, but generally the same ID as the one specified in the certificate). Each of the following payloads (TGK) includes a TGK randomly and independently chosen by the Initiator (and possible other related parameters, e.g., the key lifetime). The encrypted part is then followed by a MAC, which is calculated over the KEMAC payload, using an authentication key auth_key.

The key recovery field KRFi added to the initiator's message comprises the TGK (or envelope key) protected using the initiator's shared key $E_{KA}$ obtained using GAA.

The conventional responder verification message is modified slightly and is set out below:

R_MESSAGE=HDR, T, [IDr], V, KRFr

The main objective of the verification message from the Responder is to obtain mutual authentication. The verification message, V, is a MAC computed over the Responder's entire message, the timestamp (the same as the one that was included in the Initiator's message), and the two parties identities, using the authentication key, auth_key A final field, KRFr is a key recovery field and comprises the TGK (or envelope key) protected under the responder's shared key $E_{KB}$ generated using GAA.

Because the shared keys $E_{KA}$ and $E_{KB}$ are known to the KMC 40A and KMC 40B, respectively, the relevant KMC can decrypt the key recovery fields KRFi/KRFr to obtain the TGK (or envelope key) and thereby allow lawful interception and interpretation of the data transmitted in the media plane. The TGK (or envelope key) can be used to recover TEKs. TEKs can then be used to decrypt the media plane traffic.

The users of terminals 1A and 1B are unaware that the media plane traffic is subject to lawful interception and interpretation.

Terminal 1A (the initiator) needs to retrieve the certificate of terminal 1B (the responder) before call establishment is permitted.

Diffie Hellman Method

As will be known to those skilled in the art, in the Diffie Hellman (DH) encryption method, terminal 1A and terminal 1B each have a respective DH private value a,b. In the conventional manner terminal 1A transmits a DH public value to terminal 1B by transmitting the value $g^a$. Similarly, terminal 1B transmits a DH public value to terminal 1A by transmitting the value $g^b$ Terminal 1A then generates a private key by raising the received value $g^b$ to the power a—i.e. calculating $(g^b)^a$. Similarly, terminal 1B generates a private key by raising the received value $g^a$ to the power b, i.e. it calculates the value $(g^a)^b$. Because the value $(g^a)^b$ is the same as the value $(g^b)^a$, both terminals 1A and 1B now have a shared private or secret DH key. The DH key is used as the TGK.

A strength of the Diffie Hellman encryption method is that, if either the value $(g^a)$ or the value $(g^b)$ or both are intercepted when they are transmitted by the terminals, this will not allow derivation of the private or shared secret key.

For the Diffie Hellman method, the key recovery field must be generated in a different way.

Accordingly, the standard MIKEY initiator message for Diffie Hellman is modified as follows:

I_MESSAGE=HDR, T, RAND, [IDi]CERTi],[IDr] {SP}, DHi, SIGNi, KRFi

Responder messages modified as follows:

R_MESSAGE=HDR, T, [IDr]CERTr], IDi, DHr, DHi, SIGNr, KRFr

In the conventional manner, the field DHi in the initiator message and in the responder message contains the initiator's DH public value. The field DHr in the responder message contains the responder's DH public value. This allows each terminal 1A and 1B to derive the private or secret DH key, this is used as the TGK.

According to this embodiment, the key recovery field, KRFi, is added to the initiator message. The field KRFI contains the initiator's DH private key a encrypted using the shared key $E_{KA}$ generated using GAA.

Similarly, the final field KRFr of the responder message includes the responder's DH private key b encrypted using the key $E_{KB}$ generated using GAA.

Such an arrangement allows the initiator's network core 3A to obtain initiator's DH private key a by decrypting the key recovery field, KRFi, and allows the responder's network core 3B to obtain the responder's DH private key (or the TGK) by decrypting the key recovery field, KRFr. The initiator's network core 3A can then combine the DH private key a with the responder's DH public value $g^b$ to derive the TGK which in turn can be used to recover the TEKs and permit lawful interception and interpretation of the media plane traffic.

As an alternative to the above the key recovery fields may be generated by encrypting the TGK or the TEKs, instead of the DH private key, with $E_{KA}$ for KRFi and $E_{KB}$ for KRFr.

In this embodiment too, the users of terminals 1A and 1B are unaware whether or not they are subject to lawful interception and interpretation of their media plane traffic.

Some possible variants to support corporate customers (or other closed user groups) are briefly discussed below:

- User could use a corporate PKI portal or corporate KMC instead of the one provided by the network operator
- Communication with PKI portal or KMC secured using GAA
  - Operator provided security—operator USIM/ISIM used for GAA
  - Corporate provided security—a corporate ISIM on UICC used for GAA
- "Hidden" ISIM installed on every new UICC, but only UICC supplier knows the unique ISIM key
- Operator "enables" the ISIM on customer request using OTA methods
- Operator provides GAA infrastructure to corporate so that they can issue keys and certificates for IMS media security to their employees
- UICC supplier delivers unique ISIM keys directly to corporate for loading onto GAA infrastructure
  - ISIM keys not revealed to IMS operator
- Lawful interception could be supported if needed to monitor employee communications, or to comply with legislation
- GAA infrastructure could also be used to issue other types of certificates, e.g. for corporate VPN access

The invention claimed is:

1. A method of establishing a secure end-to-end communication channel for sending secure messages between a first device associated with a first communication network and a second device associated with a second communication network, and wherein at least one of the devices includes security data for generating such secure messages, the method comprising:
   establishing a control plane connection between the first device and an IP-based Multimedia Subsystem (IMS) core of the first network, the control plane connection being protected by a security architecture;
   securely establishing key information between the first device and a key management center (KMC) of the associated first network using the control plane connection and corresponding security architecture;
   transmitting the key information from the KMC to the IMS core of the first network;
   transmitting the key information from the IMS core to an IMS core of the second network; and
   using the key information to establish a secure end-to-end communication channel between the first device and the second device for sending secure messages therebetween, the key information being usable to enable the first network core to interpret intercepted secure messages sent between the first and second devices.

2. The method according to claim 1, wherein the messages are sent in a media plane.

3. The method according to claim 1, wherein at least one of the devices comprises a mobile cellular communications terminal.

4. The method according to claim 1, wherein the key information comprises key means for decrypting communications sent from the first device to the second device over the media plane, the key means being sent over the control plane in encrypted form.

5. A communication network core for facilitating the establishment of a secure end-to-end communication session for sending secure messages on an IP-based Multimedia Subsystem (IMS) media plane between a first device and a second device, the first device being registered with the network core, and the second device being registered with another communication network core, the communication network core comprising:
   means for establishing a first control plane connection with the first device, the first control plane connection being protected by a security architecture;
   an IMS core configured to establish a second control plane connection with an IMS core of the other communication network;
   a key management center (KMC) configured to:
   securely establish a key $E_{KA}$ between the communication network core and the first device using the first control plane connection and corresponding security architecture;
   establish a key $E_{KAB}$ between the communication network core and the other communication network core;
   decrypt an encrypted key $E_{KA}(K1)$, received by the communication network core from the first device using the first control plane connection, using the key $E_{KA}$ to determine a key K1; and
   encrypt the key K1 using the key $E_{KAB}$ to form an encrypted key $E_{KAB}(K1)$ that is transmitted to the IMS core, the IMS being configured to transmit the encrypted key $E_{K_{AB}}$ (K1) to the IMS core of the other communication network core using the second control plane connection;

means for establishing a media plane connection between the first device and the second device that allows the key K1 to be used to encrypt and decrypt secure messages sent between the first and second devices; and means for using the key K1, determined by the KMC, to interpret the secure messages sent between the first and second devices.

6. A method of securely communicating an end-to-end encryption and decryption key between a first device and a second device for data transmitted on an IP-based Multimedia Subsystem (IMS) media plane, the first device being registered with a first communication network and the second device being registered with a second communication network, the method comprising:

establishing a key $E_{K_A}$ between the first device and a first key management center (KMC) of the first communication network;

establishing a key $E_{K_B}$ between the second device and a second KMC of the second communication network;

establishing a key $E_{K_{AB}}$ between the first KMC and the second KMC;

at the first device, generating an end-to-end key K1 and encrypting the key K1 using the key $E_{K_A}$ to form an encrypted key $E_{K_A}(K1)$;

transmitting the encrypted key $E_{K_A}(K1)$ from the first device to the first KMC;

at the first KMC, decrypting the encrypted key $E_{K_A}(K1)$ using the key $E_{K_A}$ to determine the key K1, and encrypting the key K1 using the key $E_{K_{AB}}$ to form an encrypted key $E_{K_{AB}}(K1)$;

transmitting the encrypted key $E_{K_{AB}}(K1)$ from the first communication network to the second communication network comprising:

transmitting $E_{K_{AB}}(K1)$ from the first KMC to a first IMS core of the first communication network;

transmitting $E_{K_{AB}}(K1)$ from the first IMS core to a second IMS core of the second communication network; and transmitting $E_{K_{AB}}(K1)$ from the second IMS core to the second KMC;

at the second KMC, decrypting the encrypted key $E_{K_{AB}}$(K1) using the key $E_{K_{AB}}$ to determine the key K1, and encrypting the key K1 using the key $E_{K_B}$ to form an encrypted key $E_{K_B}(K1)$;

transmitting the encrypted key $E_{K_B}(K1)$ from the second KMC to the second device; and at the second device, decrypting the encrypted key $E_{K_B}$(K1) using the key $E_{K_B}$ to determine the key K1.

7. The method recited in claim 6, wherein the method is performed using a control plane connection.

8. The method recited in claim 6, wherein the method is integrated with call establishment signaling between the first device and the second device.

9. The method recited in claim 6, wherein establishing the key $E_{K_A}$ between the first device and the first KMC comprises using a generic authentication architecture (GAA) procedure in which the first KMC acts as a network application function (NAF).

10. The method according to claim 9 wherein the GAA procedure is used to authenticate the first device with the first communication network using authentication information, and establishing the key $E_{K_A}$ between the first device and the first KMC further comprises reusing the authentication information to derive the key $E_{K_A}$.

11. The method according to claim 10, wherein the authentication information used in the GAA procedure comprises authentication information stored on a Subscriber Identity Module-SIM associated with the first device.

12. The method recited in claim 6, wherein establishing the key $E_{K_B}$ between the second device and the second KMC comprises using a generic authentication architecture (GAA) procedure in which the second KMC acts as a network application function (NAF).

13. The method recited in claim 6, wherein transmitting the encrypted key $E_{K_A}(K1)$ from the first device to the first KMC comprises:

transmitting the encrypted key $E_{K_A}(K1)$ from the first device to the first IMS core; and transmitting $E_{K_A}(K1)$ from the first IMS core to the first KMC.

14. The method recited in claim 6, wherein transmitting the encrypted key $E_{K_B}(K1)$ from the second KMC to the second device comprises:

transmitting $E_{K_B}(K1)$ from the second KMC to the second IMS core; and transmitting the encrypted key $E_{K_B}(K1)$ from the second IMS core to the second device.

15. The method recited in claim 6, further comprising:

at the second device, generating an end-to-end key K2 and encrypting the key K2 using the key $E_{K_B}$ to form an encrypted key $E_{K_B}(K2)$;

transmitting the encrypted key $E_{K_B}(K2)$ from the second device to the second KMC;

at the second KMC, decrypting the encrypted key $E_{K_B}(K2)$ using the key $E_{K_B}$ to determine the key K2, and encrypting the key K2 using the key $E_{K_{AB}}$ to form an encrypted key $E_{K_{AB}}(K2)$;

transmitting the encrypted key $E_{K_{AB}}(K2)$ from the second communication network to the first communication network;

at the first KMC, decrypting the encrypted key $E_{K_{AB}}(K2)$ using the key $E_{K_{AB}}$ to determine the key K2, and encrypting the key K2 using the key $E_{K_A}$ to form an encrypted key $E_{K_A}(K2)$;

transmitting the encrypted key $E_{K_A}(K2)$ from the first KMC to the first device; and at the first device, decrypting the encrypted key $E_{K_A}(K2)$ using the key $E_{K_A}$ to determine the key K2.

16. A method of establishing a secure end-to-end communication channel for transmitting and receiving secure messages on an IP-based Multimedia Subsystem (IMS) media plane between a first device and a second device, the first device being registered with a first communication network and the second device being registered with a second communication network, the method comprising:

securely communicating end-to-end encryption and decryption keys between the first device and the second device as recited in claim 15;

at the first device, encrypting data using the key K1 and transmitting the encrypted data to the second device on the IMS media plane;

at the second device, receiving the encrypted data from the first device on the IMS media plane and using the key K1 to decrypt the data;

at the second device, encrypting data using the key K2 and transmitting the encrypted data to the first device on the IMS media plane; and at the first device, receiving the encrypted data from the second device on the IMS media plane and using the key K2 to decrypt the data.

17. A method of establishing a secure end-to-end communication channel for transmitting and receiving secure messages on an IP-based Multimedia Subsystem (IMS) media plane between a first device and a second device, the first device being registered with a first communication network and the second device being registered with a second communication network, the method comprising:
- securely communicating an end-to-end encryption and decryption key between the first device and the second device as recited in claim 6;
- at the first device, encrypting data using the key K1 and transmitting the encrypted data to the second device on the IMS media plane; and
- at the second device, receiving the encrypted data from the first device on the IMS media plane and using the key K1 to decrypt the data.

18. The method recited in claim 17, wherein a key recovery field is sent in a message on the IMS media plane from the first device to the second device, the key recovery field being usable by the first KMC to interpret the message.

19. A method of interception and interpretation of secure messages transmitted on an IP-based Multimedia Subsystem (IMS) media plane between a first device and a second device, the first device being registered with a first communication network and the second device being registered with a second communication network, the method comprising:
- establishing a secure end-to-end communication channel for transmitting and receiving secure messages between the first device and the second device as recited in claim 17; and
- at the first or second IMS core, using the key K1 determined at the respective first or second KMC to decrypt secure messages sent between the first and second devices.

* * * * *